US012610021B2

(12) United States Patent
Schröer et al.

(10) Patent No.: US 12,610,021 B2
(45) Date of Patent: Apr. 21, 2026

(54) METHOD FOR MULTISPECTRAL RECORDING OF AN IMAGE STREAM AND ASSOCIATED IMAGE RECORDING SYSTEM

(71) Applicant: Scholly Fiberoptic GmbH, Denzlingen (DE)

(72) Inventors: Stefan Schröer, Freiburg (DE); Daniel Härter, Emmendingen (DE); Hannes Joseph, Bahlingen (DE); Johannes Bourbon, Freiburg (DE); Matthias Kühn, Elzach (DE)

(73) Assignee: Scholly Fiberoptic GmbH, Denzlingen (DE)

( * ) Notice: Subject to any disclaimer, the term of this patent is extended or adjusted under 35 U.S.C. 154(b) by 119 days.

(21) Appl. No.: 18/582,787

(22) Filed: Feb. 21, 2024

(65) Prior Publication Data
US 2024/0297955 A1 Sep. 5, 2024

(30) Foreign Application Priority Data
Feb. 22, 2023 (DE) .......................... 102023104305.6

(51) Int. Cl.
| | |
|---|---|
| *H04N 5/77* | (2006.01) |
| *H04N 23/12* | (2023.01) |
| *H04N 23/56* | (2023.01) |
| *H04N 23/81* | (2023.01) |
| *H04N 23/951* | (2023.01) |

(52) U.S. Cl.
CPC ............... *H04N 5/77* (2013.01); *H04N 23/12* (2023.01); *H04N 23/56* (2023.01); *H04N 23/81* (2023.01); *H04N 23/951* (2023.01)

(58) Field of Classification Search
CPC .......... H04N 5/77; H04N 23/12; H04N 23/56; H04N 23/951; H04N 23/81
USPC ........................................................ 348/241
See application file for complete search history.

(56) References Cited

FOREIGN PATENT DOCUMENTS

| | | |
|---|---|---|
| DE | 102011001200 A1 | 9/2011 |
| DE | 102008016766 B4 | 7/2016 |
| DE | 102019132045 A1 | 5/2020 |
| DE | 102022002637 B3 | 7/2023 |

*Primary Examiner* — Joel W Fosselman
(74) *Attorney, Agent, or Firm* — Volpe Koenig

(57) ABSTRACT
A method for multispectral recording of an image stream, in which a sequence of single images of a scene, in particular a continuous video image data stream, is recorded as an image stream using an image sensor of an image recording system. At least two different types of single images are recorded in different associated wavelength ranges using the image sensor. At least one type A single image of the sequence is recorded during a chronological type A recording segment and at least one type B single image of the sequence is recorded during a chronological type B recording segment. The type A recording segment and the type B recording segment are chronologically separated from one another by a respective waiting interval, in which no image data are sensorially acquired using the image sensor. An image recording system is also provided that to carry out the method.

20 Claims, 6 Drawing Sheets

METHOD FOR MULTISPECTRAL RECORDING OF AN IMAGE STREAM AND ASSOCIATED IMAGE RECORDING SYSTEM

CROSS-REFERENCE TO RELATED APPLICATIONS

This application claims priority from German Patent Application No. 10 2023 104 305.6, filed Feb. 22, 2023, which is incorporated herein by reference as if fully set forth.

TECHNICAL FIELD

The invention relates to a method for multispectral recording of an image stream. In the method, a sequence of single images (=sequence of so-called "frames") of a scene (for example a specific OP situation), is recorded as an image stream using an image sensor of an image recording system. In particular, the image stream can be recorded in the form of a continuous video image data stream in the method. Furthermore, at least two different types of single images, are recorded in the method, in particular alternately, in different associated wavelength ranges (and at different points in time) using the image sensor. For example, the different single images can alternate in the sequence. I.e., in such methods the single images are chronologically separated from one another.

The invention furthermore relates to an image recording system, which can be designed as an endoscope, exoscope, or microscope. The image recording system has (at least) one image sensor, which is configured to record at least two different types of single images (as described above), in particular alternately, in different associated wavelength ranges (and at different points in time) in the form of a continuous image stream. If multiple image sensors are used in the image recording system, each of these image sensors can be used according to the invention.

BACKGROUND

Such methods and image recording systems are previously known from the prior art. However, previous approaches have often been directed in this case to spatially separating the different spectra to be sensorially acquired, for example, with the aid of beam splitters and wavelength-selective mirror surfaces, which are typically designed as dichroic beam splitters. However, this enormously increases the technical expenditure to produce such an image recording system. Moreover, in particular in chip-in-tip endoscopes, the installation space generally only permits the use of a limited number of, for example, only two CMOS image sensors. The number of spectrally different single images is thus limited from the outset. Furthermore, these systems typically have very precisely defined spectral ranges which may only be changed by an exchange of a mirror layer or a beam splitter which performs spectral splitting of the imaging beam path.

A novel field of application of methods and image recording systems as described at the outset is so-called "advanced imaging". This can be understood as the approach of providing additional optical functionality for the user with the aid of commercial CMOS image sensors (in future possibly having 4K resolution and a frame rate of 60 Hz), which generally only offer typical white light imaging, for example, by recording additional spectra. It is presently, for example, possible to optically acquire the oxygen saturation in human tissue (i.e., by offsetting different spectral ranges according to specific offsetting rules) and thus detect tumors in the body of a patient early using an endoscope with application of "advanced imaging". Furthermore, it is also possible to differentiate different types of tissue on the basis of a spectral fingerprint, wherein typically multiple spectrally different single images also have to be recorded for this purpose. A further application of "advanced imaging" is recording fluorescence images using a CMOS image sensor and superimposing each of these fluorescence images with a white light image acquired using the same CMOS image sensor.

In such approaches, an alternating illumination, which thus chronologically changes, is also often used.

SUMMARY

Proceeding therefrom, the invention is based on the object of opening up new technical options for high performance "advanced imaging" applications.

To achieve this object, one or more of the features disclosed herein are provided according to the invention in a method for multispectral imaging. In particular, it is therefore proposed according to the invention to achieve the object in a method of the type mentioned at the outset that at least one type A single image of the sequence is recorded during a chronological type A recording segment and at least one type B single image of the sequence is recorded during a chronological type B recording segment, and that the type A recording segment and the type B recording segment are chronologically separated from one another by a respective waiting interval, in which no image data are sensorially acquired using the image sensor. It is also to be noted that this waiting interval does not necessarily have to be generated between the single images ("frames"); for example, a short dead time can also be provided between the single images, wherein the dead time can also occur due to the image sensor itself.

It is to be highlighted at this point that the invention thus proposes recording at least one type A single image and the at least one type B single image using the same image sensor, preferably with chronologically changing/alternating illumination. It is obvious that this concept is also transferable to three or even four different types of single images, which each spectrally differ and are recorded using the same image sensor, with changing illumination and in chronological succession.

If novel fluorescent pigments are used or if there is a desired change of the spectral range to be acquired, an already existing image recording system according to the invention does not necessarily have to be adapted. It is often sufficient solely to change an excitation or illumination wavelength used in order to implement the desired adaptation.

Complex multispectral imaging, in particular with alternating spectrally different illumination using a first and a second illumination light, in particular as described herein, using only a single image sensor is therefore enabled using the method proposed according to the invention.

The at least two types of single images differ spectrally, thus at least in one spectral wavelength range, in particular in at least one wavelength. Therefore, in particular the spectral bandwidth and/or the distribution of wavelengths which are reproduced by the single images can result differently. These wavelengths or this wavelength are/is sensorially acquired during the respective associated recording segment and thus reproduced in the associated single image. The respective wavelength does not necessarily have to be directly acquired in this case, rather a fluorescence excitation can also take place, which is then sensorially acquired, i.e., in this case the image sensor acquires a wavelength based on fluorescence. In such cases, it is usually advantageous if the excitation light used for exciting the fluorescence is filtered out of the imaging beam path of the image recording system by corresponding filters. This is because the respective fluorescent light can be selectively acquired in this case.

It can be provided, for example, that the type B single images reproduce a fluorescence wavelength which is not reproduced in the type A single images.

It is also conceivable that both the recorded type A single images and the recorded type B single images each reproduce fluorescent light. However, only one of the two types of single images (thus only the type A or only the type B single images) reproduce the scene in white light illumination; or vice versa, only one of the two types of single images reproduces the fluorescence signal (emission light); or the respective fluorescent light reproduced by the respective single image differs in the wavelength (for example, upon the use of at least two fluorophores, which are optically excited to emission at different points in time).

Such an embodiment is advantageous in particular if excitation light is continuously incident on the scene. In this case, for example, via subtractive spectrum reconstruction and/or by means of signal processing, the recorded fluorescence component can be extracted from the white light images (for example, type A single images) after the recording of the respective single image, so that ultimately solely white light images are available. Upon the playback, for example, fluorescence images acquired as type B single images can then be superimposed on the solely white light images obtained via signal processing, in order to thus provide additional image information to the user in the sense of "advanced imaging". This embodiment can therefore result in improved imaging.

The first and second wavelength range can have a spectral overlap range. However, the first and second wavelength range are not identical and are therefore selected differently in order to be able to record spectrally different types of single images using the image sensor.

The type A recording segment can be understood as the duration of the time span or time spans within a time interval which is actually used for recording the type A single image. Similarly, the type B recording segment can be understood as the duration of the time span or time spans within a time interval which is used for recording the type B single image. The duration of the recording segments can be of different lengths, or equal in length. Therefore, for example, depending on the light sources used and/or the wavelengths to be acquired, the duration of the recording segments can be varied in order to be able to save energy with loss-free image resolution and to reduce the production of heat.

The use of the waiting interval has the advantage that a period of time is available in which a change of the illumination can take place. As already mentioned above, the waiting interval can be forced or results inherently, for example, from the activation of the image sensor. The waiting interval can therefore comprise a dead time or switching time of the image sensor. The waiting interval can therefore be understood as a recording-free pause segment in which no image data are sensorially acquired or recorded using the image sensor. The waiting interval can advantageously, however, be used for reading out the image sensor, for example, wherein then image information is read out which was sensorially acquired in a prior recording segment using the sensor.

Due to the waiting interval, therefore in particular electronically modulated light sources can be used as illumination light sources, which only have a limited "slew rate"/rate of rise (with respect to the emitted intensity), and therefore require a certain amount of time to reach the full illumination intensity upon being switched on. The waiting interval is advantageous in this case because the image sensor only begins to record the respective single image when the light source also actually provides the desired light intensity. Moreover, the waiting interval offers enough time to be able to wait out a decay of the intensity of a light source which is in particular not to be acquired in a location-resolved manner as image information in a subsequent recording segment.

The use of the waiting interval in the method according to the invention and the accompanying possible use as described above of electronically modulated light sources having a limited "slew rate"/rate of rise can advantageously reduce or even prevent heating of an image recording system (which comprises said image sensor), in particular an endoscope. Therefore, for example, during endoscopic examinations, heating of the endoscope impermissible according to medical norms can be avoided. A further advantage is that with the aid of the waiting intervals, in particular upon use of an image sensor having a "rolling shutter", a more stable/constant flow of light can be achieved without overshoots.

Therefore, the object mentioned at the outset is achieved by the mentioned technical effects and the accompanying advantages of the method according to the invention, since novel possibilities are provided for high-performance "advanced imaging" applications.

In one advantageous embodiment of the method, it can be provided that the waiting interval (in which the image sensor can be read out and a reset of the image sensor can take place) is at least 0.1%, at least 1%, at least 2%, at least 5%, or even at least 10% of a period T, which results from an image refresh rate f of the image sensor as $T=1/f$. The image refresh rate of the single images is described here as f [Hz]. In this advantageous embodiment, a (comparatively) slow rise/fall of the respective light intensity shortly before beginning/ending the associated recording segment can thus be enabled. Since the waiting interval can be at least 2%, 5%, or 10% of a period T, the proportion of the waiting interval can thus occupy a significant proportion of the overall time span specified by the image refresh rate. In this way, a method, in particular upon use of an image recording system as described herein, can be designed cost-effectively because light sources and associated electronic driver circuits having lower slew rate can be used.

The method may be applied particularly advantageously if the scene is illuminated using a chronologically alternating illumination during the recording of the single images. This is because in this way the at least two different types of single images spectrally differ (thus the respective image contents were generated using different light spectra and thus reflect the spatial distribution of these respective light spectra). The alternating illumination can preferably be generated in that at least one light source of the image recording system is modulated, wherein this modulation is preferably electronically implemented (for example, by means of a corresponding electronic driver circuit). An intensity and/or a spectral property (in particular an average emission wavelength of the light source) of the light source can be chronologically changed by the modulation, for example, in order to thus obtain the desired alternating illumination.

In one advantageous embodiment of the method, it is provided that the scene is illuminated during the type A recording segment using a first illumination light, which is in a first wavelength range. In this way, (in particular only) one actively controlled light source can advantageously be used in the method for generating an alternating illumination. As a second or further light source, for example, ambient light and/or a second illumination light can be provided by an additional external light source which is not modulated or cannot be modulated. This second illumination light can in particular be an excitation light for fluorescence imaging.

Furthermore, it can be provided that the scene is illuminated during the type B recording segment using a second illumination light, which is in a second wavelength range differing from the first wavelength range. Therefore, for example, two light sources can be used, which are each chronologically modulated in order to thus enable a change between the first and the second illumination light. Due to the use of different light sources, for example, a large bandwidth of wavelength ranges can be used for generating an image stream. A large bandwidth of recording possibilities can thus be enabled, in particular upon use of an image recording system as described herein, which is advantageous in particular in medical imaging methods.

The first wavelength range can, for example, characterize white (broadband) illumination light as the first illumination light. In contrast, the second illumination light can be characterized, for example, by a second wavelength range which has a narrower band in comparison to the white light. For example, the second illumination light can be an excitation light in order to thus be able to record fluorescence images (as type B single images).

Therefore, a first light source can be used to emit white light as the first illumination light and/or an excitation light source can be used to emit excitation light as the second illumination light. A fluorescence—which can be acquired using the image sensor—can therefore be excited within the observed scene by the excitation light.

In one advantageous embodiment of the method, it can be provided that the respective waiting interval coincides with a respective chronological overlap segment, in which both the first illumination light and the second illumination light are incident on the scene. This embodiment has the advantage that an actively controlled light source and a passive, preferably constantly illuminated light source can be used to generate an alternating illumination.

The overlap segment also enables the waiting interval to be kept relatively short, so that the previously described proportion of the waiting interval in the period T can result as quite short. A chronological resolution of the image stream can thus be particularly high, in particular even if a light source having a (relatively) low light intensity emits illumination light onto the scene, because the length of the respective recording segment can be chronologically extended. The resulting waiting interval can thus in particular be shorter than the chronological overlap segment.

In one advantageous embodiment of the method, it is provided that in the waiting interval the image sensor is operated and/or activated so that no image data are recorded using the image sensor. In this way, the recording of mixed images can be prevented if the waiting interval coincides with an overlap segment, in particular the above-mentioned overlap segment. Mixed images are to be understood here in particular as images which comprise both the first and the second illumination light, thus are not "spectrally pure". The use of the waiting interval in particular prevents the image sensor from sensorially acquiring light although the image sensor can be activated and/or read out electronically during the waiting interval.

In particular, it can be provided that no image data are recorded using the image sensor if respective intensities of the first illumination light and/or the second illumination light within the overlap segment are each above a respective intensity threshold, which would generate respective image signals on the image sensor which would be above a noise threshold of the image sensor and could thus be sensorially acquired in a location-resolved manner in principle using the image sensor (and would thus result in image data).

The respective intensity thresholds for the first and second illumination light, which correspond to the noise threshold of the image sensor, can be at different levels. This is because on the one hand the optical losses are wavelength dependent and on the other hand the quantum efficiency of the image sensor can also differ significantly for different wavelengths.

Location-resolved acquisition can be understood here to mean that the image sensor can assign the received light signals to individual image points/pixels and therefore the intensity values are not lost in the noise of the image sensor. That is to say, a location-resolved sensory acquisition enables the recording of images of the respective illumination light. It is to be taken into consideration in this case that the intensity of the illumination light required for this purpose, which is incident on the scene, can be at different levels: on the one hand, because the resulting optical reflection from the scene will be in different dimensions depending on the wavelength; and, on the other hand, because the image sensor (and the optical unit used for imaging) can sensorially acquire different wavelengths with different qualities, for example, due to a spectrally different quantum efficiency.

In one advantageous embodiment of the method, it is provided that in a first overlap segment, the intensity of the first illumination light rises, while the intensity of the second illumination light drops and/or that in a second overlap segment the intensity of the first illumination light drops, while the intensity of the second illumination light rises. A recording segment of a type A single image or type B single image can thus lie between the first overlap segment and the second overlap segment. Therefore, both types (A/B) of single images and the two overlap segments (first or second overlap segment) can chronologically alternate. By way of this embodiment, the overlap segments can be used to switch over the illumination between the first and the second illumination light. During this change, namely in the waiting interval, the image sensor is not used or operated for image recording.

In general, the method according to the invention is also usable for sequences of more than two (for example, three, four, or even more) different spectra.

In one advantageous embodiment of the method, it is provided that a, in particular the above-mentioned, intensity of the first illumination light and/or a, in particular the above-mentioned, intensity of the second illumination light is raised above an associated intensity threshold value or is kept above an associated intensity threshold value at least during a part of the waiting interval. The waiting intervals can thus be kept chronologically relatively short, by which an image rate and thus the recording quality of the image stream can be improved. Because the intensity of the first and/or the second illumination light can be kept above an intensity threshold value, costly and time-consuming switching-on processes of the light sources described herein can be reduced, because the light source is not completely switched off during the method. Such a method can thus manage in a particularly advantageous embodiment without switching off in particular the first and/or second light source described herein.

It can thus be stated that during a waiting interval, the intensity of the first illumination light can rise above the associated intensity threshold value or can already be above it. This is advantageous in particular if the recording segment associated with the illumination light promptly follows the waiting interval and/or if an illumination light as described herein is not to be switched off.

In particular, it can be provided in the above-mentioned embodiment that image signals are generated on the image sensor using the respective illumination light, which are above a noise threshold of the image sensor and would therefore be able to be sensorially acquired in a location-resolved manner using the image sensor. Due to the location-resolved sensorial acquisition, the image sensor could thus already record images during the waiting interval which are generated on the image sensor by the respective illumination light, the intensity of which is above the intensity threshold value. However, the image sensor first acquires the light in the respective recording segment and not yet during the waiting interval. A large bandwidth of image sensors and of different light sources can thus be used in the method.

In one advantageous embodiment of the method, it is provided that the intensity of the first illumination light and/or the intensity of the second illumination light is lowered below an associated intensity threshold value or is kept below an associated intensity threshold value during at least a part of the waiting interval. This method embodiment can be advantageous in particular if the associated wavelength ranges of the different types of single images have a relatively large spectral overlap range. The illumination light, which is not to be acquired in the recording segment that follows the waiting interval, could thus already be lowered or kept below the intensity threshold in the waiting interval (early preventive lowering). The recording segments or the single images generated therein can thus represent the recorded scene with better quality. It can also be provided in particular in this method form that image signals are generated on the image sensor using the respective illumination light which are above a noise threshold of the image sensor and could therefore be sensorially acquired in a location-resolved manner using the image sensor. Similarly to the above-described embodiment, the image sensor can first acquire the illumination light in the respective recording segment and not yet during the waiting interval.

In one advantageous embodiment of the method, it is provided that a first light source illuminates the scene using the first illumination light wherein a second light source illuminates the scene using the second illumination light. Different light sources can thus be used for the different illumination lights. The light sources can differ here in particular in their design, positioning, or possible modulation, by which an illumination of the scene can be optimally adapted to the external circumstances. Both light sources can be part of the image recording system here (wherein this is not absolutely required).

It can also be provided in the method that a property, in particular an intensity and/or a spectral property, of the first and/or the second illumination light is/are modulated during the type A recording segment and/or during the type B recording segment and/or during the waiting interval. A desired alternating illumination can thus be obtained by the modulation of the first and/or the second illumination light.

A temporary reduction of an intensity of an illumination light used can ensure that heating of an endoscope as described herein can be kept as low as possible, so that a patient to be examined is not harmed. A modulation can be carried out, for example, in cost-effective form by a rotating filter wheel, in particular upon use of an external light source (thus located outside the image recording system in particular described herein). However, embodiments are preferred in which the respective light source of the image recording system is electronically modulated, because then the advantages of the method can be fully used and a compact image recording system can be obtained.

It can thus be provided that the above-described modulation is specified electronically by the image recording system. In this way, a modulation of the illumination can advantageously be carried out by the image recording system, due to which the method can be variably adapted independently of an external light source to specific recording conditions and/or technical specifications.

In particular, such an electronic modulation can be carried out according to a rate of the image sensor. In this way, an alternating illumination generated by means of the modulation can be synchronized with the rate/image frequency of the image sensor.

Such a modulation can accordingly be achieved in particular by an electronic modulation of the first and/or the second light source. A modulation of a specific illumination light (for example, the first and/or second illumination light described herein) can thus be carried out. A modulation of the first illumination light can thus be carried out, for example, by the first light source, in particular according to a rate of the image sensor In one advantageous embodiment of the method, it can be provided that during the type A recording segment, the second illumination light is incident on the scene but at an intensity which is below an associated intensity threshold which would generate image signals on the image sensor which are above a noise threshold of the image sensor. In this concept, the associated light source therefore does not have to be completely switched off, rather the intensity is only reduced strongly enough that the respective illumination light can no longer be acquired in a location-resolved manner as image information using the image sensor. Such a procedure can be advantageous to be able to shorten the duration of the waiting interval (since it is no longer necessary to modulate from 0% to 100%) and/or to extend the service life of the light sources (since they have to be switched off completely less often).

This advantageous concept can also be designed so that during the type B recording segment, the first illumination light is incident on the scene but at an intensity which is below an associated intensity threshold which would generate image signals on the image sensor which are above a noise threshold of the image sensor. In particular, the first light source can remain permanently switched off during the image recording for this purpose. A continuous illumination with white light can thus be carried out, for example.

In one advantageous embodiment of the method, it can be provided that at least the first and/or the second illumination light is emitted from the first and/or second light source as an excitation light for exciting a physical system (such as a fluorophore) located in the scene. Fluorophores located in the scene can thus be excited to light emission by the excitation light, for example. Light emitted as a result by optical excitation can be sensorially acquired by the image sensor. The excitation light reflected from the scene, in contrast, can be kept away from the image sensor using an excitation light filter. The method can thus be used in particular to make luminescent and/or fluorescent physical systems visible, which is of interest in particular for diagnostic applications.

The type A recording segment can be selected to be chronologically shorter or longer than the type B recording segment. The different recording segments for generating the image stream can thus be formed in different chronological lengths. The sensitivity in the acquisition of the single images can be improved by recording segments selected at different lengths for different types of single images, because the image sensor can require recording segments of different lengths depending on the spectrum used in order in each case to record images of acceptable quality, in particular with respect to the signal-to-noise ratio (SNR). The duration of the recording segments can thus be varied depending on the light sources used and/or the wavelengths to be acquired, in order to sensorially acquire an optimum amount of light using the sensor for each single image.

Furthermore, a first waiting interval can be selected in its chronological length differing from a second following waiting interval, i.e., the chronological length of the respective waiting interval can also be varied. Thus, for example, the first waiting interval could only be chronologically half as long as the following waiting interval. In such a case, the length of the respective waiting interval can be adapted to the "slew rate"/rising or falling rate of the light source used, in order to thus be able to generate high-quality single images over the entire image stream. The waiting interval can only be selected as sufficiently long in each case as required by the respective "slew rate", so that the recording segments can be selected to be as long as possible, which is advantageous to achieve a high SNR.

Alternatively or additionally, one of the waiting intervals contained in the image stream can be selected as chronologically identical, thus in particular equally long and synchronous, with an associated overlap segment, in which both the first illumination light and the second illumination light are incident on the scene. The waiting interval can be optimally utilized in this way in order to carry out a change of the illumination without negatively influencing the image quality of the image stream.

It can be provided, for example, that only single ones of the waiting intervals chronologically overlap with an associated overlap segment. This can be the case, for example, if first the first light source is turned down in its intensity during the waiting interval before the second light source is turned up in its intensity, so that in this range the two illumination lights do not chronologically overlap.

It can also be provided that at least two waiting intervals coincide with the same overlap segment. The resulting overlap segment can be longer here than each of the recording segments. Such a method design can be achieved, for example, if none of the light sources used is completely switched off during the recording of the image stream, but is only sufficiently reduced in its respective intensity.

Furthermore, additional features directed to an image recording system are provided according to the invention to achieve the mentioned object. In particular, it is therefore proposed according to the invention to achieve the mentioned object in an image recording system of the type described at the outset that the image sensor is configured during the recording of the image stream to generate a waiting interval between a chronological type A recording segment in which at least one type A single image can be recorded and a chronological type B recording segment in which at least one type B single image can be recorded, wherein no image data can be acquired using the image sensor in the waiting interval. The image sensor can thus change to a waiting mode, in which no image information is recorded, during the waiting interval.

This image recording system according to the invention, which is suitable for multispectral imaging and can be designed in particular as an endoscope, exoscope, or microscope, has the advantage of the optomechanically simpler and more cost-effective production in relation to known multi-image sensor systems having beam splitters and optical filters. Moreover, the electronic expenditure is reduced due to the use of only a single image sensor. Nonetheless, depending on the application, corresponding filters or beam splitters can obviously also be formed in an image recording system according to the invention. Moreover, the present invention is not only restricted to image recording systems having only a single image sensor, but can of course also be implemented in systems having multiple image sensors.

Such an image recording system can be used for the method described herein for high-performance "advanced imaging" applications. The image recording system is therefore preferably designed and/or configured to carry out a method as described above and/or according to one of the claims directed to a method.

To generate alternating illumination, the image recording system can also comprise at least one light source, which can be electronically modulated in particular. It is preferred here for a compact construction if an associated driver electronics unit is integrated into the image recording system. This driver electronics unit can provide, for example, a chronologically variable driver current for the light source in order to modulate its intensity. If the light source is designed, in contrast, as a tunable light source, the driver electronics unit can thus be configured, for example, to tune an emission wavelength of the light source.

For example, the image sensor can be a CMOS image sensor, a CCD sensor, and/or an RGB sensor. In general, both polychromatic and monochromatic image sensors can be used in an image recording system according to the invention.

The image recording system can moreover be designed, in particular if a CMOS image sensor is used, as a chip-in-tip endoscope, wherein then the image sensor and possibly the above-mentioned at least one light source can be arranged in a distal tip of the endoscope.

If an alternating illumination is used, it is thus advantageous if the image sensor is configured to generate the waiting interval chronologically synchronized with a modulation of the at least one light source (the image sensor can do this as a function of this modulation, or the image sensor specifies the modulation of the light source with its own rate). The recording of the single images and the change of the illumination can thus be chronologically matched to one another. The modulation of the illumination can trigger the image recording frequency of the image sensor here, in particular so that then the waiting interval is also generated as a function of the modulation by the image sensor.

In the waiting interval, in particular independently of an intensity of the first and/or the second illumination light, the sensor is configured not to acquire image data. However, the image sensor does not have to be limited to the acquisition of two different illumination lights, but can be designed and/or configured to acquire three or more different light spectra.

In one advantageous embodiment of the image recording system, it is provided that a first light source for emitting first illumination light and a second light source for emitting second illumination light are designed as internal light sources of the image recording system. The two illumination lights spectrally differ here. It is particularly preferred in this case if at least one, in particular both of the two light sources is/are designed so they can be electronically modulated, to thus be able to implement an alternating illumination. The light sources can preferably be positioned in spatial proximity, in particular directly adjacent to the image sensor, which can be advantageous in particular in chip-in-tip endoscopes.

As mentioned, the respective modulation of the light source can preferably be implemented by means of a driver electronics unit integrated in the image recording system. The respective light source can thus be modulated during the recording of the image current, in particular during a waiting interval. The internal driver electronics unit furthermore allows a compact design of the image recording system. However, due to the use of waiting intervals, the driver electronics unit can be dimensioned so that excess thermal power loss does not occur in operation, because a limited "slew rate", due to the waiting interval, does not have a negative effect on the imaging. I.e., the driver electronics unit can accordingly be dimensioned smaller/weaker, which is advantageous to avoid excessive heating of the image recording system.

By means of a modulation as explained above, in particular the wavelength and/or an illumination time and/or an intensity of an illumination light, which is emitted by a light source of the image recording system, can be modulated. The image recording system can thus also be flexibly used, because this type of modulation may be changed electronically. In other words, the electronic modulation of the at least one light source of the image recording system can thus be made adjustable.

It can also be provided that at least one light source of the image recording system is designed to emit an excitation light. Physical systems of the scene can thus be excited to light emission, so that emission light can be generated in the scene. This emission light can then be sensorially acquired by the image sensor. The image recording system, in particular the image sensor or an optical unit upstream of the image sensor, can have an optical excitation light filter here in order to keep excitation light, which is reflected from the scene, away from the image sensor. Such an image recording system can be used to acquire fluorescent light and/or luminescent light.

BRIEF DESCRIPTION OF THE DRAWINGS

The invention will now be described in more detail on the basis of exemplary embodiments, but is not restricted to these exemplary embodiments. Further designs of the invention can be obtained from the following description of a preferred exemplary embodiment in conjunction with the general description, the claims, and the drawings.

In the following description of various preferred embodiments of the invention, elements corresponding in their function receive corresponding reference numerals even with differing design or shaping.

In the figures:

Figure 1:
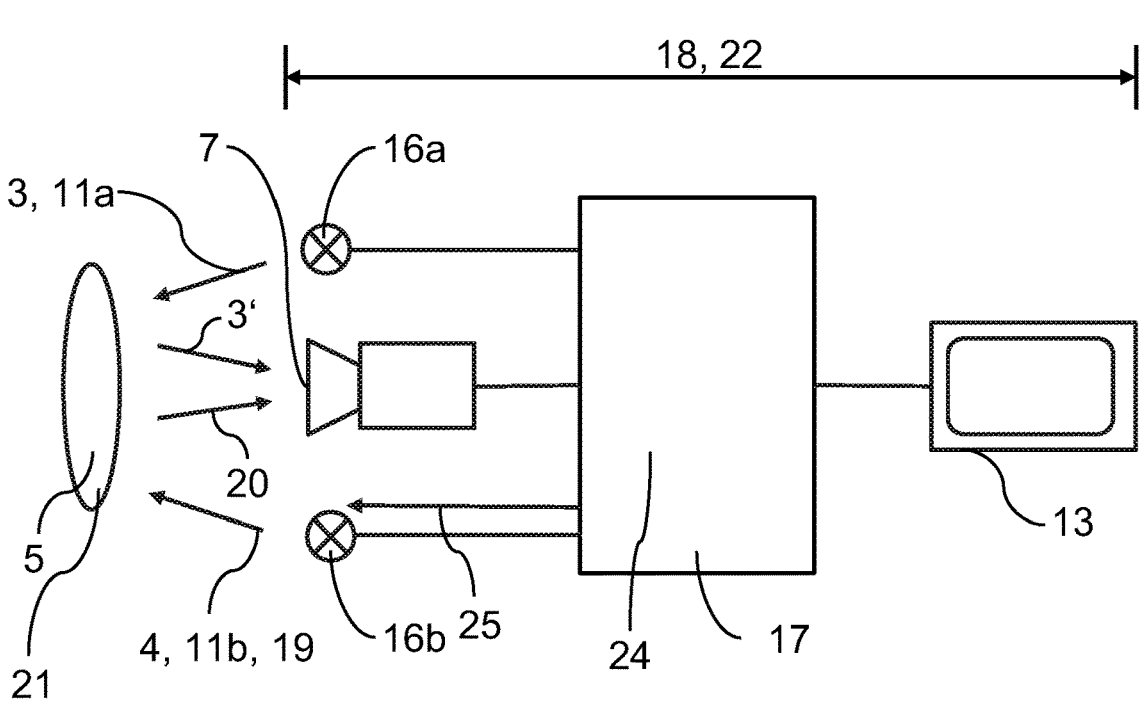
Figure 2:
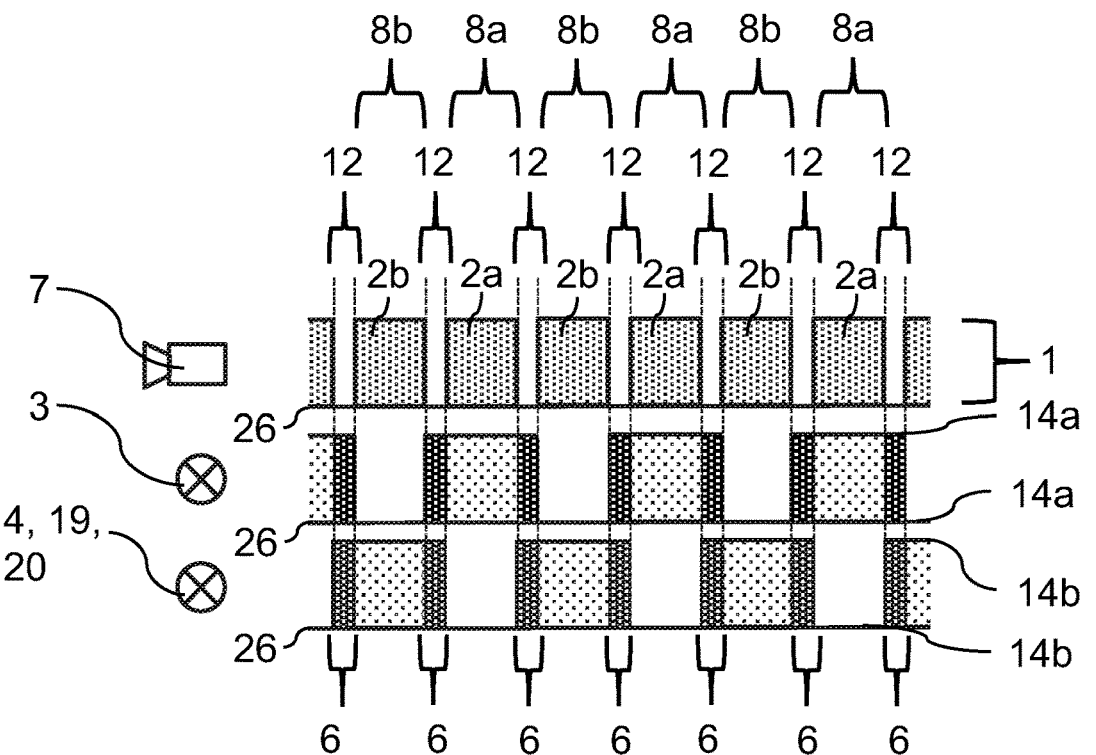
Figure 3:
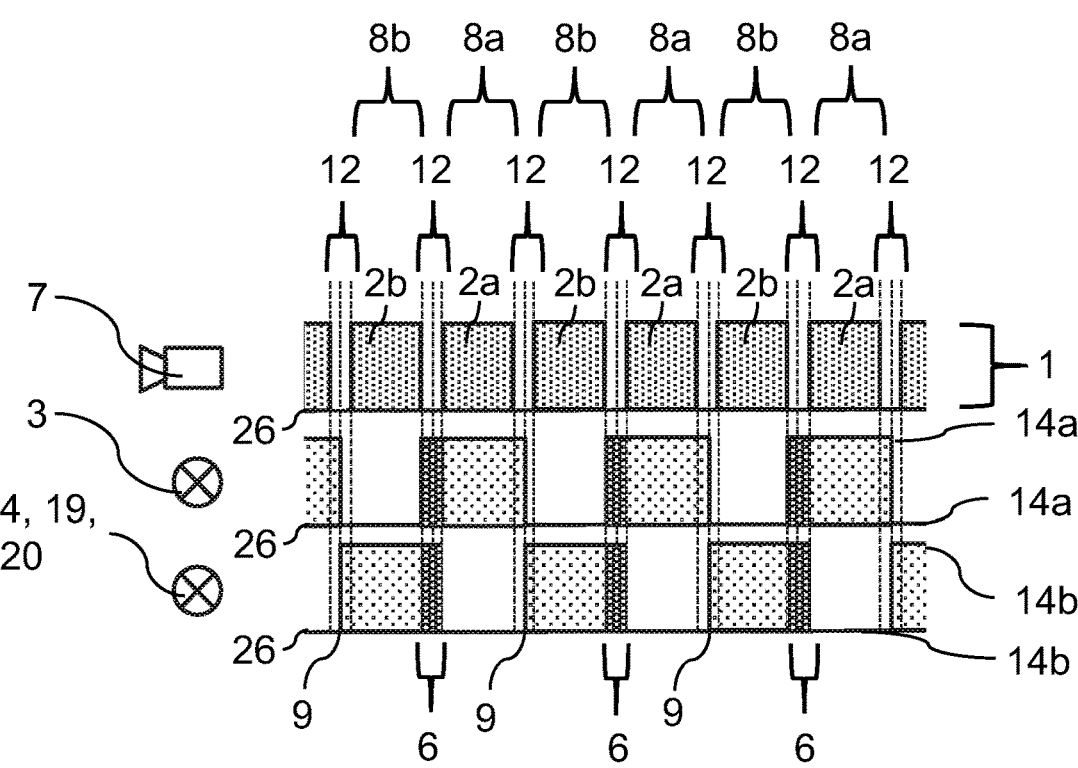
Figure 4:
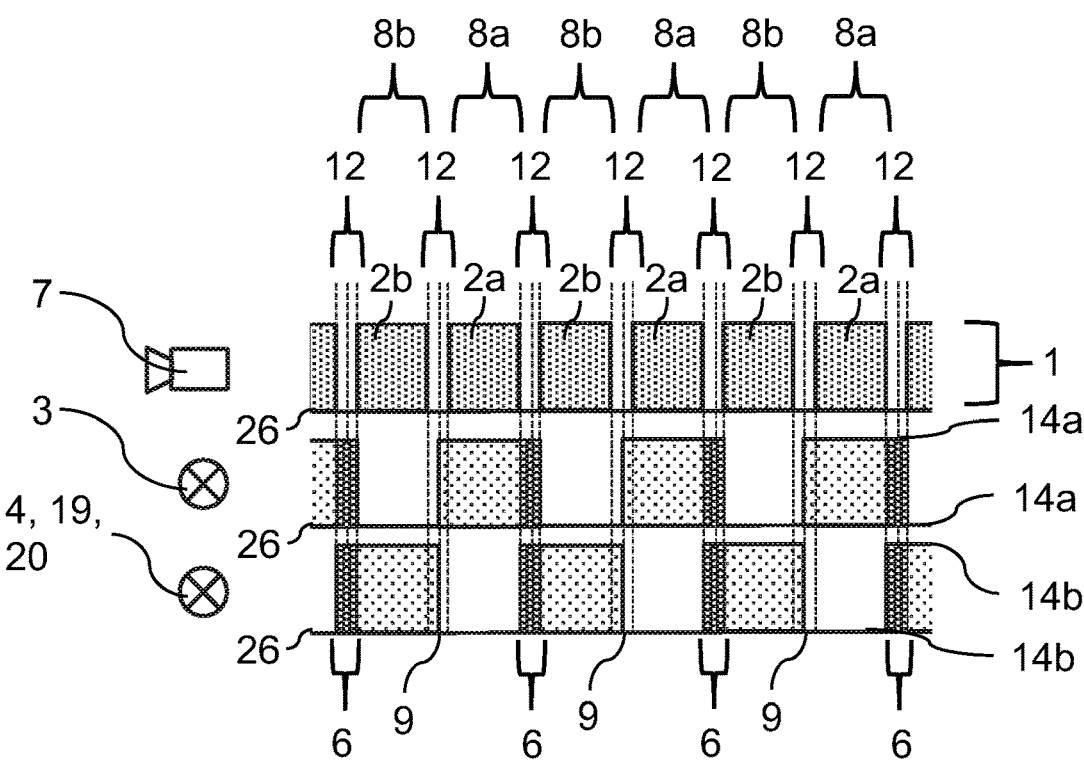
Figure 5:
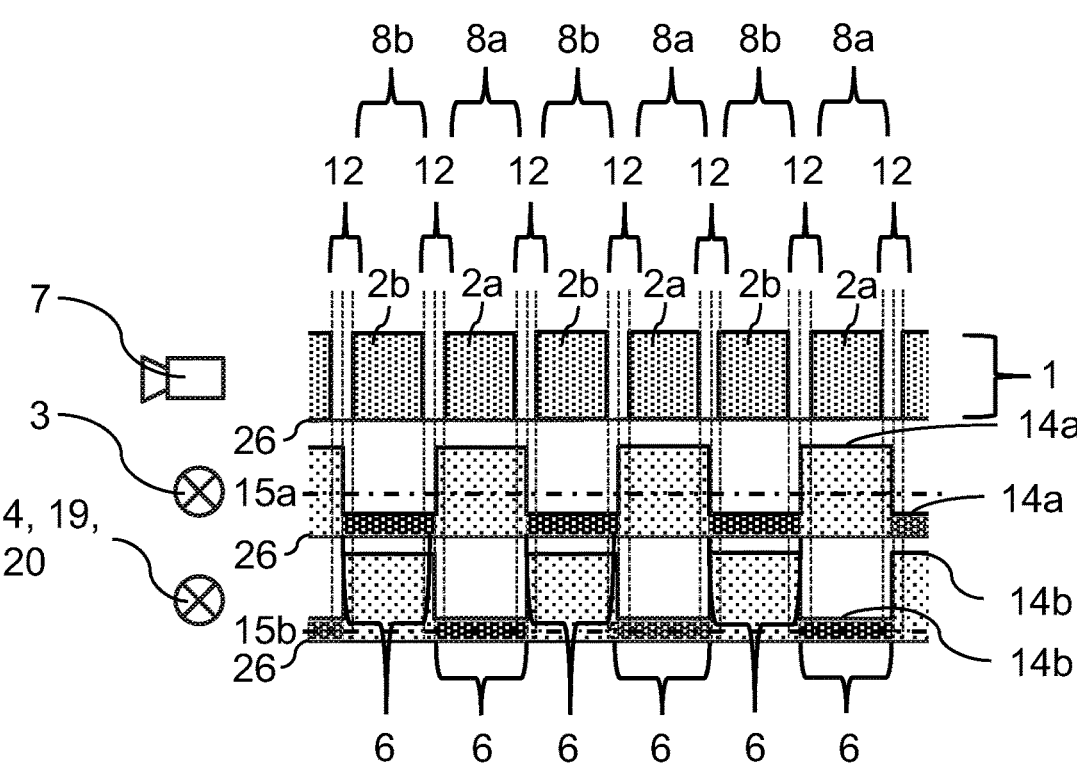
Figure 6:
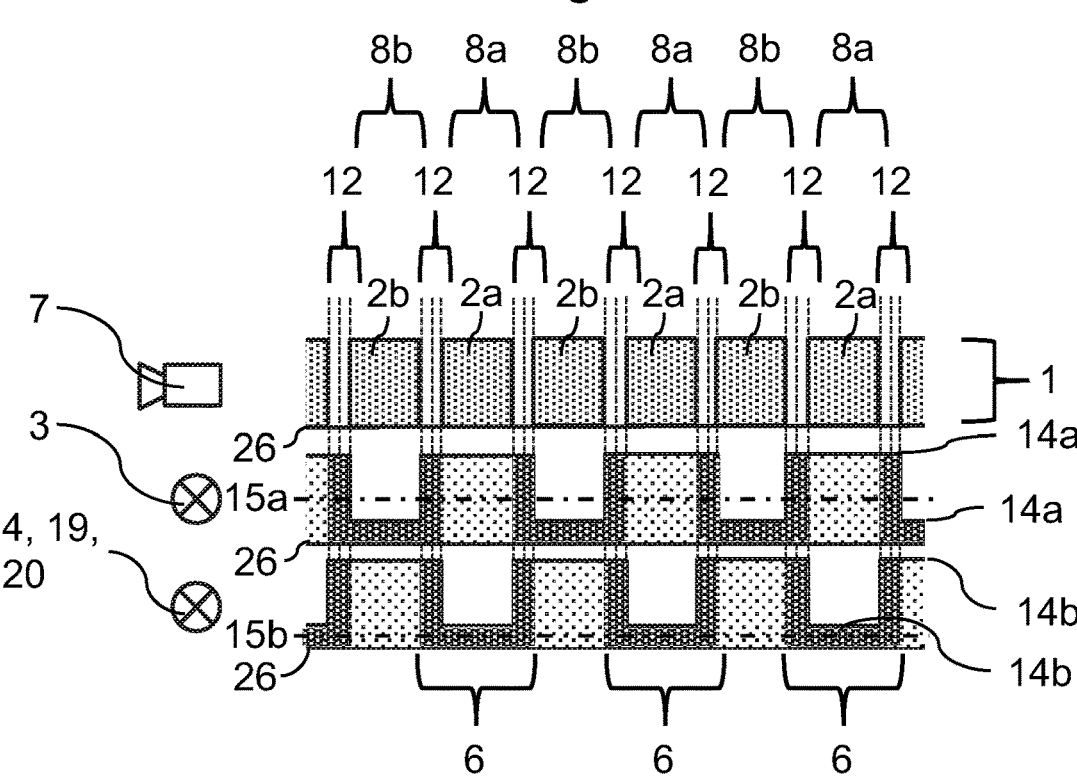
Figure 7:
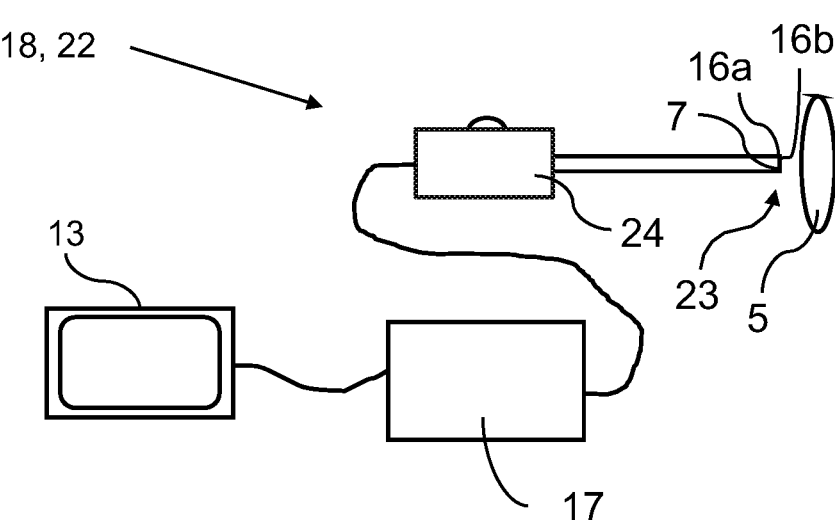
Figure 8:
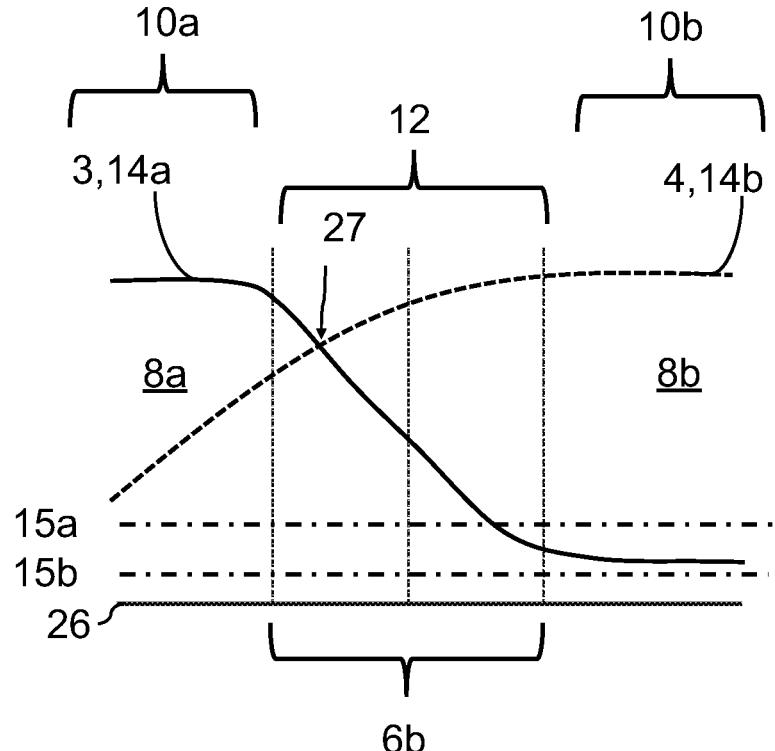
Figure 9:
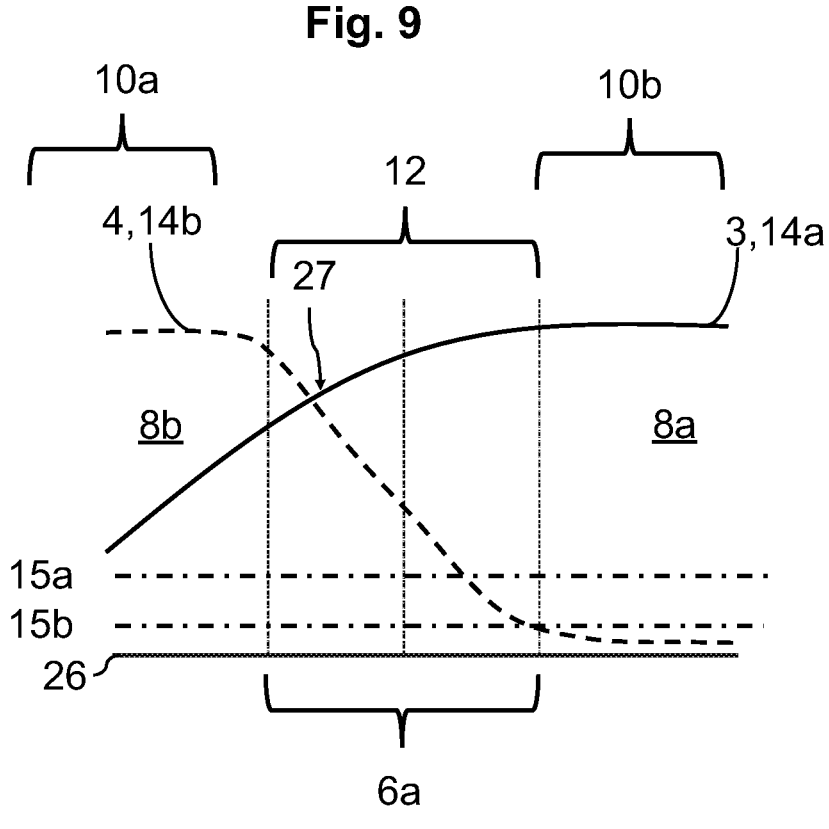
Figure 11:
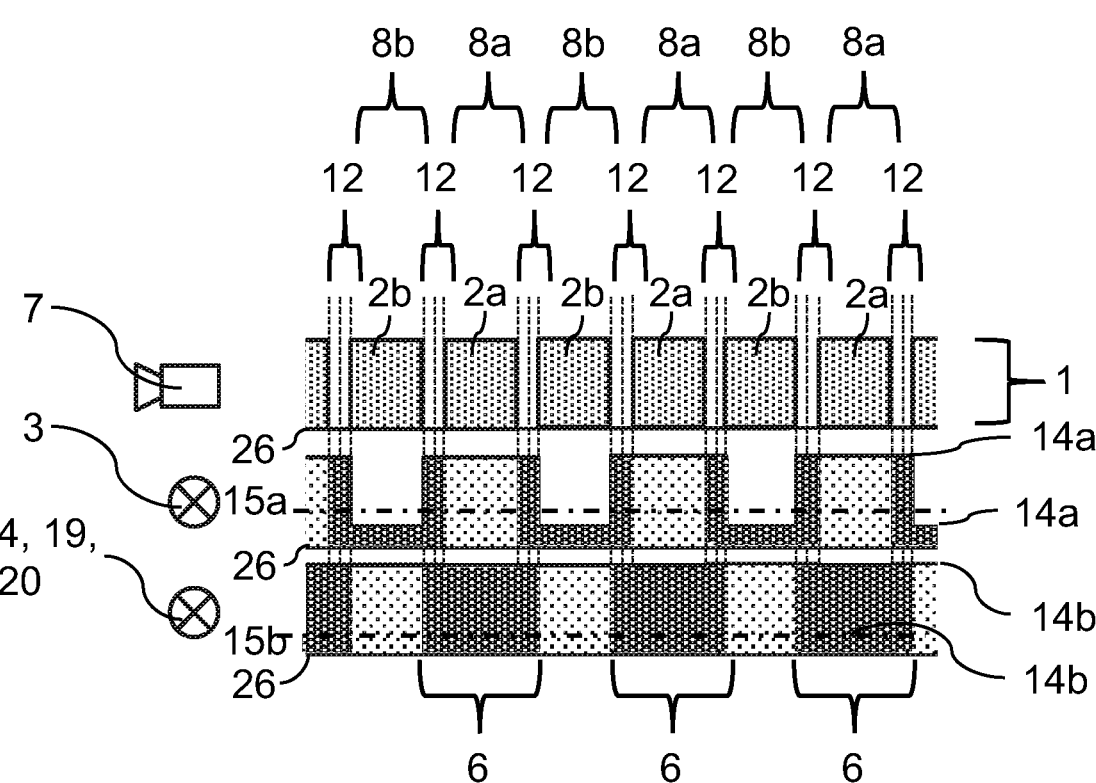
Figure 12:
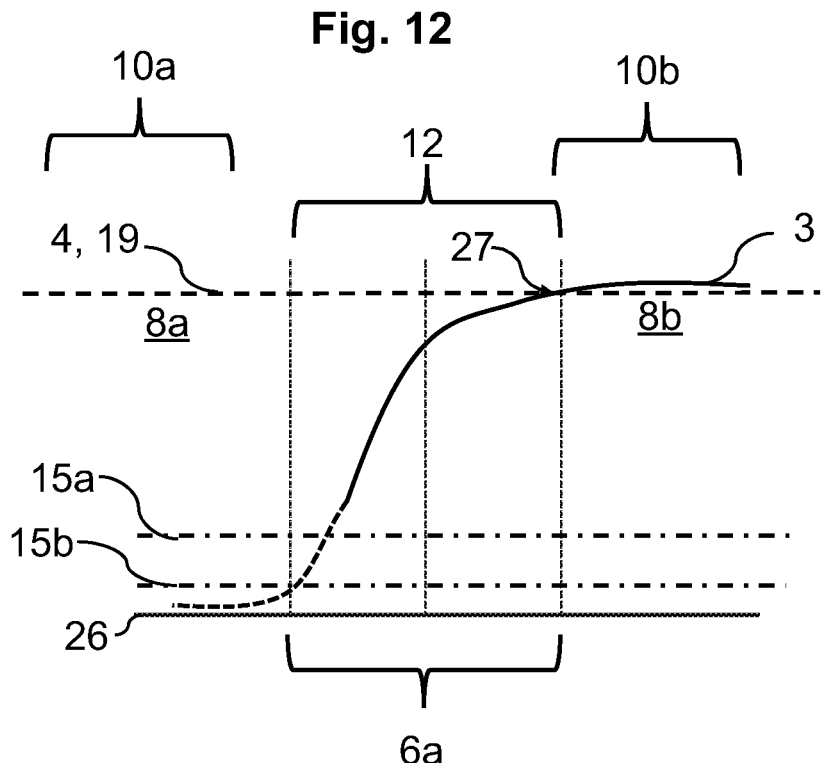

FIG. 1 shows a schematic representation of an image recording system according to the invention during the illumination of a scene, FIG. 2 shows a schematic course of a method according to the invention for multispectral recording of an image stream, FIG. 3 shows a schematic course of a second embodiment of the method according to the invention, FIG. 4 shows a schematic course of a third embodiment of the method according to the invention, FIG. 5 shows a schematic course of a fourth embodiment of the method according to the invention, FIG. 6 shows a schematic course of a fifth embodiment of the method according to the invention, FIG. 7 shows an outline of an image recording system according to the invention designed as an endoscope, FIG. 8 shows a detail of the method shown in FIG. 2 with focus on a waiting interval and the intensities modulated therein of the first and second illumination light, FIGS. 9/10 show details of two successive waiting intervals in an embodiment alternative to that shown in FIG. 2, FIG. 11 shows a schematic course of a sixth embodiment of the method according to the invention, and FIG. 12 shows a detail of the method shown in FIG. 11 with focus on a waiting interval and the intensities shown therein of the first and second illumination light.

DETAILED DESCRIPTION

FIGS. 1 and 7 schematically show an image recording system 18 according to the invention designed as an endoscope 22. The image recording system 18 has an image sensor 7, which is configured to record two different types of single images 2a, 2b in different wavelength ranges 11a, 11b in the form of a continuous image stream 1. Image streams 1 which were recorded by the image recording system 18 are shown in FIGS. 2 to 6 and 11.

The image sensor 7 shown in all figures is a single CMOS image sensor, so that the image recording system 18 can be used in "advanced imaging" methods and is therefore designed for medical applications.

In further alternative embodiments (not shown), the image sensor 7 can record more than two different types of single images 2a-2n in different wavelength ranges 11a-11n in the form of a continuous image stream 1. The designs described hereinafter also apply similarly to those embodiments having more than two different types of single images 2, however.

The image sensor 7 of the image recording system 18, 22 is configured to generate a waiting interval 12 (like the waiting intervals 12 shown in FIGS. 2-6 and 8-12) between a chronological type A recording segment 8a, in which at least one type A single image 2a is recordable, and a chronological type B recording segment 8b, in which at least one type B single image 2b is recordable. The image sensor 7 does not acquire any image data in the waiting interval 12. A period of time is thus provided by the waiting interval 12 in which a change of the illumination can take place without this change interfering with the imaging. In this recording-free pause, thus during a waiting interval 12, however, the image sensor 7 can be electronically read out, for example. Due to the waiting interval 12, the light sources 16 of the first illumination light 3 (light source 16a) and the second illumination light 4 (light source 16b) can be electronically modulated in order to thus carry out a change of the illumination.

The modulation takes place via a driver electronics unit 24 integrated into the image recording system 18. The driver electronics unit 24 is in communication with a control unit 17 via a control path 25. The control unit 17 is connected to a monitor 13, which plays back the image stream 7 that shows the scene 5.

In embodiments which are not shown, a filter wheel can also be used for modulation. This is reasonable in particular if one of the light sources 16a, 16b is an external light source 16.

The first light source 16a of the image recording system 18, 22 emits white light as the first illumination light 3 in a wavelength range 11a between 400 and 750 nm. The illumination light 3 which is incident on the scene 5 is backscattered from there to the image recording system 18 as the illumination light 3'.

The second light source 16b of the image recording system 18 emits excitation light 19 as the second illumination light 4 in a wavelength range 11b between 800 and 830 nm. The excitation light 19 excites a fluorophore, which is located in the scene 5, so that the fluorophore generates emission light 20 which is acquired by the image sensor 7. The excitation light 19 does also reach the image recording system 18 due to scattering, but is kept away from the image sensor 7 by an excitation light filter.

The image recording system 18 of FIGS. 1 and 7 is designed as a chip-in-tip endoscope 22, which can be seen in particular in that the two light sources 16a, 16b and the image sensor 7 are formed at a distal end 23 of the image recording system 18 or the endoscope 22 (FIG. 7). Furthermore, optical filters and electronic amplifiers can also be installed in the image recording system 18, 22 in order to be able to convert received light signals into high-resolution single images 2a, 2b.

The image recording system 18, 22 shown in FIGS. 1 and 7 is designed to carry out a method according to the invention, in particular as described hereinafter, and configured for this purpose.

FIGS. 2 to 6 and 8 to 12 show exemplary embodiments according to the invention of the method according to the invention for multispectral recording of an image stream 1. The statements on FIGS. 1 and 8 apply correspondingly here to FIGS. 2 to 6 and 8 to 12.

In the method according to the invention, a sequence of single images 2a, 2b of the scene 5 is recorded over a chronological course 26 (=time axis). The recording is carried out in all examples shown as a continuous video image data stream and with the aid of the image sensor 7, which acquires both the first illumination light 3 and the second illumination light 4. Since, as described above, the wavelength ranges 11a, 11b of the first and second illumination light 3, 4 are different, the recorded types of single images 2a and 2b are spectrally different. It is also to be noted once again here that the image sensor 7 acquires the emission light 20, which is generated as a result of the illumination of the physical system 21 of the scene 5 using the excitation light 19 (second illumination light 4).

The image streams 1 shown in the exemplary embodiments show a sequence of multiple type A single images 2a and multiple type B single images 2b, wherein type A single images 2a are recorded during the chronological type A recording segment 8a shown and type B single images 2b are recorded during the chronological type B recording segment 8b shown.

In the method, at least one type A recording segment 8a and one type B recording segment 8b are chronologically separated from one another by a respective waiting interval 12. No image data are sensorially acquired using the image sensor 7 in the waiting interval 12.

However, as in the examples of FIGS. 3 and 4, it can be provided that a waiting interval 12 forms a time gap 9. In such a time gap 9, one illumination light 3 or 4 directly follows the other illumination light 3, 4 without chronologically overlapping therewith, however. A change of the illumination of the scene 5 can thus advantageously be performed without the illumination lights 3, 4 chronologically overlapping.

The waiting interval 12 can be at least 2%, 5%, or even at least 10% of a period T, which results from an image refresh rate f of the image sensor (7) as T=1/f. The waiting intervals 12 of the embodiments shown in FIGS. 2-6 and 11 are each chronologically somewhat more than 10% of the period T.

In the examples shown, the waiting intervals 12 coincide with a respective chronological overlap segment 6, in which the first illumination light 3 and the second illumination light 4 are incident on the scene 5. The waiting intervals 12 are of equal chronological length here (FIGS. 2-4) or result as shorter than the respective overlap segments (FIGS. 5, 6, 11).

In the waiting intervals 12 of the embodiments shown, the image sensor 7 is operated or activated so that no image data are recorded using the image sensor 7. It therefore also does not interfere if the intensities 14a, 14b of the first illumination light 3 (14a) and/or the second illumination light 4, 19, 20 (14b) within the overlap segment 6 are each above a respective intensity threshold 15a, 15b, which would actually generate image signals on the image sensor 7. This is the case in the example of FIG. 6, for example, for the first and the second illumination light 3, 4. However, it can be seen in FIG. 6 that during the respective recording segment 8a, the intensity of the second illumination light 4 is below the intensity threshold 15b, wherein during the respective recording segment 8b, in contrast, the intensity of the first illumination light 3 is below the intensity threshold 15a. Therefore, the single images 2a are exclusively based on the first illumination light 3 and the single images 2b are exclusively based on the second illumination light 4 (=spectrally pure single images).

Figure 10:
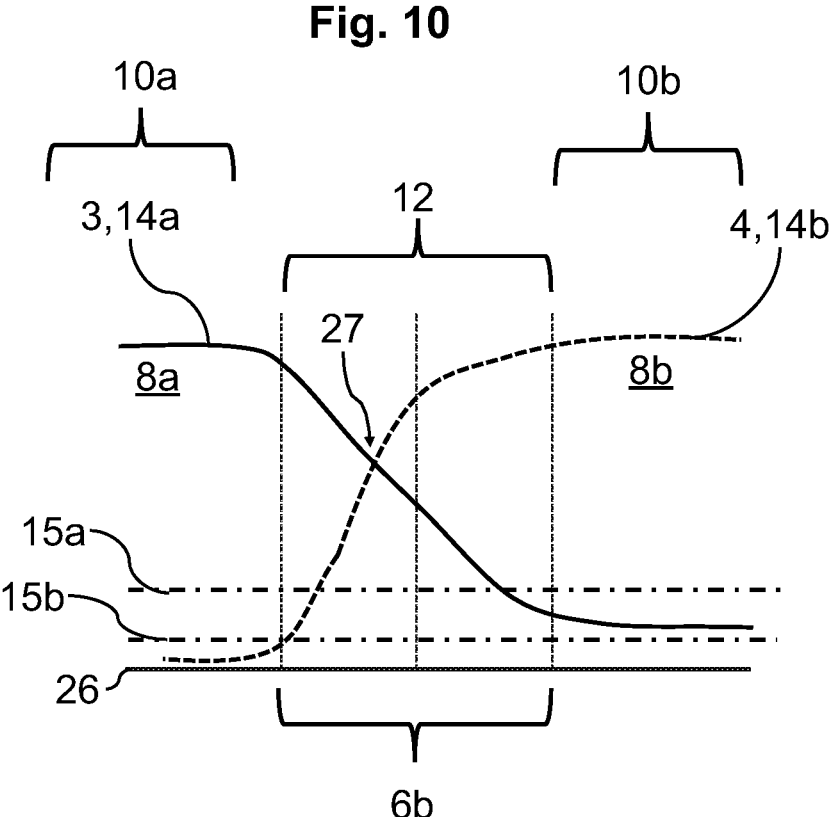

The examples of FIGS. 8 and 10 show that in an overlap segment 6b, the intensity 14b (dashed line) of the second illumination light 4 rises, while the intensity 14a(solid line) of the first illumination light 3 drops (=change of the illumination). The rise of the intensity 14b already takes place here in a partial segment 10a of the type A recording segment 8a, whereas the drop of the intensity 14a ends in a partial segment 10b. The waiting interval 12 can be kept particularly short in this way. The difference between the examples of FIGS. 8 and 10 is the available "slew rate" here, thus the rate of rise of the second illumination light 4, because of which the resulting chronological length of the waiting intervals 12 differs. In the example of FIG. 10, the waiting interval 12 is shorter due to the steeper rate of rise of the illumination light 4 than the waiting interval 12 of the example shown in FIG. 8.

The examples shown in FIGS. 9 and 12 show that in a first overlap segment 6a, the intensity 14a of the first illumination light 3 rises, while the intensity 14b of the second illumination light 4 drops (FIG. 9) or remains constant (FIG. 10). In the latter case, the light source 16b, which supplies the second illumination light 4, is continuously switched on. In embodiments which are not shown, however, the light source 16a could remain continuously switched on while the light source 16b is electronically modulated.

In the examples of FIGS. 8, 9, and 12, the intensities of the illumination lights 3, 4 are at least partially above the intensity threshold values 15a 15b of the image sensor 7 for the respective illumination lights 3, 4 to be acquired, specifically during the recording segments 8a, 8b. In contrast, in the example of FIG. 10, only one of the two illumination lights 3, 4 is always above the respective intensity threshold during one of the recording segments 8a, 8b.

In the example of FIG. 8, which shows the change of the illumination after a type A single image 2a, the intensity 14b of the second illumination light 4 during the recording segment 8a has already risen above the associated intensity threshold 15b, even before the waiting interval 12 has begun. The illumination light 4 is therefore at least partially also already acquired during the recording segment 8a. In the example of FIG. 8, in the type A recording segment 8a, at least temporarily, namely at the end of the segment 8a, both the intensities 14a and 14b of the first illumination light 3 and of the second illumination light 4 are above the respective intensity thresholds 15a, 15b, so that the type A single image 2a, which is recorded in the type A recording segment 8a, thus reflects both light components 3 and 4 (spectral mixed image). The intensity 14a of the first illumination light 3 then falls within the waiting interval 12 below the associated intensity threshold value 15a, and thus does not result during the following recording segment 8b in an image signal, but rather solely generates a signal below the noise threshold of the image sensor 7. While the single image 2a is thus to be interpreted here as a spectral mixed image, since it reflects the image components from the first and the second light 3, 4, the single image 2b is spectrally pure, since it only contains image components of the second light 4.

In the example of FIG. 9, which shows the change of the illumination after a type B single image 2b, the intensity 14b of the second illumination light 4 already falls below the associated intensity threshold value 15b within the waiting interval 12, so that the second illumination light 4 no longer generates an image signal in the recording segment 8a. In contrast, in the recording segment 8b, both the second illumination light 4 and also partially (at the end of the recording segment 8b) the first illumination light 3 are sensorially acquired using the image sensor 7, because the intensity 14a of the first illumination light 3 has already risen above the intensity threshold 15a before the waiting interval 12. Such a design can also result in acceptable imaging, however, at only a lower slew rate of the light source 16a which emits the first illumination light 3, namely if the first light 3 does not significantly interfere with the imaging of the single image 2b (spectral mixed image). In the example of FIG. 9, only the single image 2a is thus spectrally pure.

Finally, in FIG. 10, in the left type A recording segment 8a only the first illumination light 3 is sensorially acquired in a location-resolved manner using the image sensor 7, while in the right type B recording segment 8b, only the second illumination light 4 is sensorially acquired in a location-resolved manner using the image sensor 7. Therefore, both single images 2a, 2b are spectrally pure here. I.e., in the example of FIG. 10, the type A single image 2a is exclusively based on image information which was generated using the first illumination light 3 and the type B single image 2b is exclusively based on image information which was generated using the second illumination light 4 (thus spectrally separated images).

In the examples of FIGS. 8-10 and 12, the overlap point 27 of the intensities 14a and 14b is in each case above the intensity thresholds 15a and 15b, but nonetheless does not interfere with the imaging. This is made possible in that the change of the illumination of the scene 5 is advantageously carried out in the waiting interval 12.

The modulation of the intensities 14a, 14b of the first and second illumination light 3, 4 by modulation of the first and second light source 16a, 16b during the individual recording segments 8a, 8b takes place electronically via the internal driver electronics unit 24 of the image recording system 18, wherein the modulation is carried out synchronously with a rate of the image sensor 7. The image sensor 7 can function here as a clock for the modulation of the light source(s) 16.

In the exemplary embodiments of FIGS. 3 and 4, the waiting intervals 12 contained in the image stream 1 are of equal chronological lengths and are selected synchronously with an associated overlap segment 6, in which both the first illumination light 3 and the second illumination light 4 are incident on the scene 5.

It can also be seen in the exemplary embodiments of FIGS. 3 and 4 that during a sequence of four waiting intervals 12, a number of two overlap segments 6 occurs, wherein each of these overlap segments 6 chronologically coincides with an associated waiting interval 12.

In the exemplary embodiments of FIGS. 5, 6, and 11, the waiting intervals 12 of the image stream 1 chronologically coincide with an overlap segment 6, wherein the overlap segments 6 are chronologically longer than the waiting intervals 12, however. Therefore, the overlap segments 6 fall in the recording segments 8a, 8b there. The cause of this is that in these examples the light sources 16 are never completely switched off, rather only the intensity is sufficiently reduced. This is because switching off of the light sources 16a, 16b can be avoided by the method according to the invention or the image recording system 18 according to the invention, by which the service lives of the light sources 16 can be extended. The intensities 14a, 14b never drop to 0% during the recording of the image stream 1, which can be seen well in FIGS. 5, 6, and 11, for example. In particular, driver circuits 24 can thus be used for the light sources 16 which display a low power loss, so that excessive heating of the image recording system 18 is avoided.

In summary, a method is proposed in which a sequence of spectrally different single images 2 is continuously recorded with the aid of a single image sensor 7, in order to thus sensorially acquire a scene 5 in a multispectral manner. An alternating illumination is used here, so that the different types of single images 2a, 2b are each generated using different illumination light spectra. To now make it possible for a comparatively slow change of the illumination not to interfere with the imaging, it is provided according to the invention that a type A single image 2a of the sequence is recorded during a chronological type A recording segment 8a and at least one type B single image 2b of the sequence is recorded during a chronological type B recording segment 8b, and furthermore the type A recording segment 8a and the type B recording segment 8b are chronologically separated from one another by a respective waiting interval 12, in which the image sensor 7 remains in a waiting mode in which the image sensor 7 does not record image data. The waiting interval 12 can thus be used to change the illumination (cf. FIG. 2).

LIST OF REFERENCE SIGNS

1 image stream
2 single image
3 first illumination light
4 second illumination light 5 scene
6 overlap segment
7 image sensor
8 recording segment
9 time gap (between two directly successive 2)
10 partial segment (of 8)
11 wavelength range
12 waiting interval
13 monitor
14 intensities of 3 (14*a*) and 4 (14*b*)
15 noise threshold value of 7 for 3 (15*a*) and 4 (15*b*)
16 light source
17 control unit
18 image recording system
19 excitation light
20 emission light
21 physical system
22 endoscope
23 distal tip of 18, 22
24 driver electronics unit
25 control path
26 chronological course
27 overlap point of 14*a* and 14*b*

The invention claimed is:

1. A method for multispectral recording of an image stream (1), the method comprising:

recording a sequence of single images (2) of a scene (5) as an image stream (1) using an image sensor (7) of an image recording system (18), in which at least two different types of the single images (2*a*, 2*b*) are recorded in different associated wavelength ranges (11*a*, 11*b*) using the image sensor (7), including recording at least one type A single image (2*a*) of the sequence during a chronological type A recording segment (8*a*) and recording at least one type B single image (2*b*) of the sequence during a chronological type B recording segment (8*b*); and chronologically separating the type A recording segment (8*a*) and the type B recording segment (8*b*) from one another by a respective waiting interval (12), in which no image data are sensorially acquired using the image sensor (7), wherein the waiting interval (12) is at least 0.1% of a period T, which results from an image refresh rate, f, of the image sensor (7) where T=1/f.

2. The method as claimed in claim 1, wherein during the recording of the single images (2*a*, 2*b*), the method further comprises illuminating the scene (5) using a chronologically alternating illumination so that the at least two different types of single images (2*a*, 2*b*) spectrally differ.

3. The method as claimed in claim 1, further comprising:

illuminating the scene (5) during the type A recording segment (8*a*) using a first illumination light (3), which is in a first wavelength range (11*a*), and illuminating the scene (5) during the type B recording segment (8*b*) using a second illumination light (4), which is in a second wavelength range (11*b*) differing from the first wavelength range (11*a*).

4. The method as claimed in claim 3, wherein the waiting interval (12) coincides with a respective chronological overlap segment (6), in which both the first illumination light (3) and the second illumination light (4) are incident on the scene (5), and the resulting waiting interval (12) is shorter than the chronological overlap segment (6).

5. The method as claimed in claim 4, further comprising in the waiting interval (12), operating or activating the image sensor (7) so that no image data are recorded using the image sensor (7) if respective intensities (14*a*, 14*b*) of at least one of the first illumination light (3) or the second illumination light (4) within the overlap segment (6) are each above a respective intensity threshold (15*a*, 15*b*), which would generate respective image signals on the image sensor (7), which would lie above a noise threshold of the image sensor (7) and could thus fundamentally be sensorially acquired in a location-resolved manner using the image sensor (7).

6. The method as claimed in claim 5, wherein at least one of a) in a first of the overlap segments (6*a*), the intensity (14*a*) of the first illumination light (3) rises, while the intensity (14*b*) of the second illumination light (4) drops, or b) in a second of the overlap segments (6*b*), the intensity (14*a*) of the first illumination light (3) drops, while the intensity (14*b*) of the second illumination light (4) rises.

7. The method as claimed in claim 6, wherein at least one of the intensity (14*a*) of the first illumination light (3) or the intensity (14*b*) of the second illumination light (4) is raised above the respective intensity threshold value (15*a*, 15*b*) or is kept above the respective intensity threshold value (15*a*, 15*b*) at least during a part of the waiting interval (12).

8. The method as claimed in claim 5, further comprising lowering the intensity (14*a*, 14*b*) of at least one of the first illumination light (3) or the second illumination light (4) below the respective intensity threshold value (15*a*, 15*b*) or keeping the intensity (14*a*, 14*b*) of at least one of the first illumination light (3) or the second illumination light (4) below the respective intensity threshold value (15*a*, 15*b*) below the respective intensity threshold value (15*a*, 15*b*) during at least a part of the waiting interval (12).

9. The method as claimed in claim 1, further comprising illuminating the scene using a first light source (16*a*) of a first illumination light (3);

illuminating the scene using a second light source (16*b*) of a second illumination light (4);

modulating a property of at least one of the first or the second illumination light (3, 4) during at least one the type A recording segment (8*a*), during the type B recording segment (8*b*), or during the waiting interval (12).

10. The method as claimed in claim 9, wherein at least one of a) the modulating of the at least one of the first or the second illumination light (3, 4) is electronically specified by the image recording system (18), or b) the modulating is achieved by an electronic modulation of the at least one of the first or the second light source (16*a*, 16*b*).

11. The method as claimed in claim 9, wherein at least one of:

a) during the type A recording segment (8*a*), the second illumination light (4) is incident on the scene (5), but at an intensity which is below an associated intensity threshold (15*b*), which would generate image signals on the image sensor (7) which are above a noise threshold of the image sensor (7), or b) during the type B recording segment (8*b*), the first illumination light (3) is incident on the scene (5) but at an intensity which is below an associated intensity threshold (15*a*), which would generate image signals on the image sensor (7), which are above a noise threshold of the image sensor (7), so that during an entire image recording of the sequence of the single images (2), both the first illumination light (3) and the second illumination light (4) are permanently incident on the scene (5).

12. The method as claimed in claim 11, further comprising:

chronologically modulating the intensity (14a) of the first illumination light (3), while maintaining the intensity (14b) of the second illumination light (4) chronologically constant, or chronologically modulating the intensity (14b) of the second illumination light (4), while maintaining the intensity (14a) of the first illumination light (3) chronologically constant.

13. The method as claimed in claim 9, wherein at least one of the first or the second illumination light (3, 4) is emitted as an excitation light (19a, 19b) for exciting a physical system (21) located in the scene (5) by a respective one of the first or the second light source (16a, 16b).

14. The method as claimed in claim 13, further comprising at least one of:

a) selecting the type A recording segment (8a) to be chronologically shorter or longer than the type B recording segment (8b);

b) selecting a first said waiting interval (12) differing in a chronological length from a second following said waiting interval (12); or c) selecting said waiting interval (12) contained in the image stream (1) to be chronologically identical, with an associated overlap segment (6), in which both the first illumination light (3) and the second illumination light (4) are incident on the scene (5).

15. An image recording system (18), comprising:

a single image sensor (7) configured to record at least two different types of single images (2a, 2b) in different wavelength ranges (11a, 11b) as a continuous image stream (1);

the image sensor (7) is further configured, during the recording of the image stream (1), to generate a waiting interval (12) between a chronological type A recording segment (8a), in which at least one type A single image (2a) is recordable, and a chronological type B recording segment (8b), in which at least one type B single image (2b) is recordable;

the image sensor (7) is further configured so that no image data can be acquired using the image sensor (7) in the waiting interval (12), and the waiting interval (12) is at least 0.1% of a period T, which results from an image refresh rate, f, of the image sensor (7) where T=1/f.

16. The image recording system (18) as claimed in claim 15, wherein the image recording system (18) comprises at least one light source (16) that is adapted to be modulated for generating an alternating illumination, and the image sensor (7) is further configured to generate the waiting interval (12) chronologically synchronous with a modulation of the at least one light source.

17. The image recording system (18) as claimed in claim 16, further comprising:

first light source (16a) for emitting first illumination light (3); and a second light source (16b) for emitting second illumination light;

the first and second light sources being internal light sources (16a, 16b) of the image recording system (18); and wherein at least one of the first and second light sources (16a, 16b) is adapted to be electronically modulated.

18. The image recording system (18) as claimed in claim 17, wherein at least one of the first or the second light sources (3, 4) emits an excitation light (19a, 19b), and the image sensor (7) is further configured to acquire an emission light (20a, 20b) based on the excitation light (19a, 19b).

19. A method for multispectral recording of an image stream (1), the method comprising:

recording a sequence of single images (2) of a scene (5) as an image stream (1) using an image sensor (7) of an image recording system (18), in which at least two different types of the single images (2a, 2b) are recorded in different associated wavelength ranges (11a, 11b) using the image sensor (7), including recording at least one type A single image (2a) of the sequence during a chronological type A recording segment (8a) and recording at least one type B single image (2b) of the sequence during a chronological type B recording segment (8b);

illuminating the scene (5) during the chronological type A recording segment (8a) with a first illumination light (3), which lies in a first wavelength range (11a);

illuminating the scene (5) during the chronological type B recording segment (8b) with a second illumination light (4), which lies in a second wavelength range (11b); and chronologically separating the type A recording segment (8a) and the type B recording segment (8b) from one another by a respective waiting interval (12), in which no image data are sensorially acquired using the image sensor (7) and a change of illumination takes place;

wherein the respective waiting interval (12) coincides with a respective temporal overlap section (6) in which both the first illumination light (3) and the second illumination light (4) illuminate the scene (5).

20. The method as claimed in claim 19, wherein at least one of:

(a) an intensity (14a) of the first illumination light (3) falls below an associated intensity threshold value (15a) during the respective waiting interval (12) such that the intensity (14a) of the first illumination light (3) does not lead to an image signal in the subsequent type B recoding section (8b), or (b) an intensity (14b) of the second illumination light (4) falls below an associated intensity threshold value (15b) during the respective waiting interval (12) such that the intensity (14b) of the second illumination light (4) no longer generates an image signal in the subsequent type A recording section (8a).

* * * * *